Patented Nov. 4, 1930

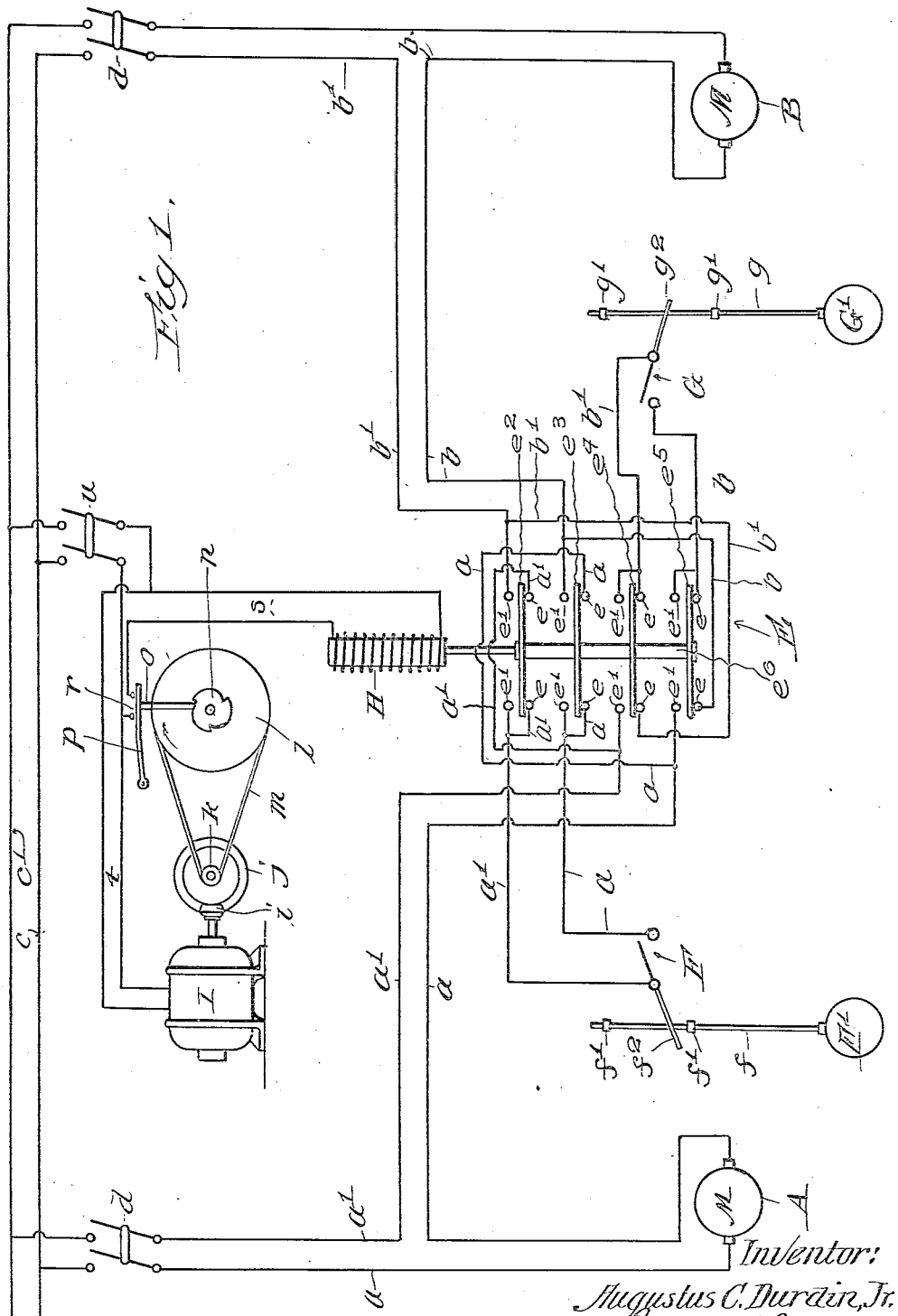

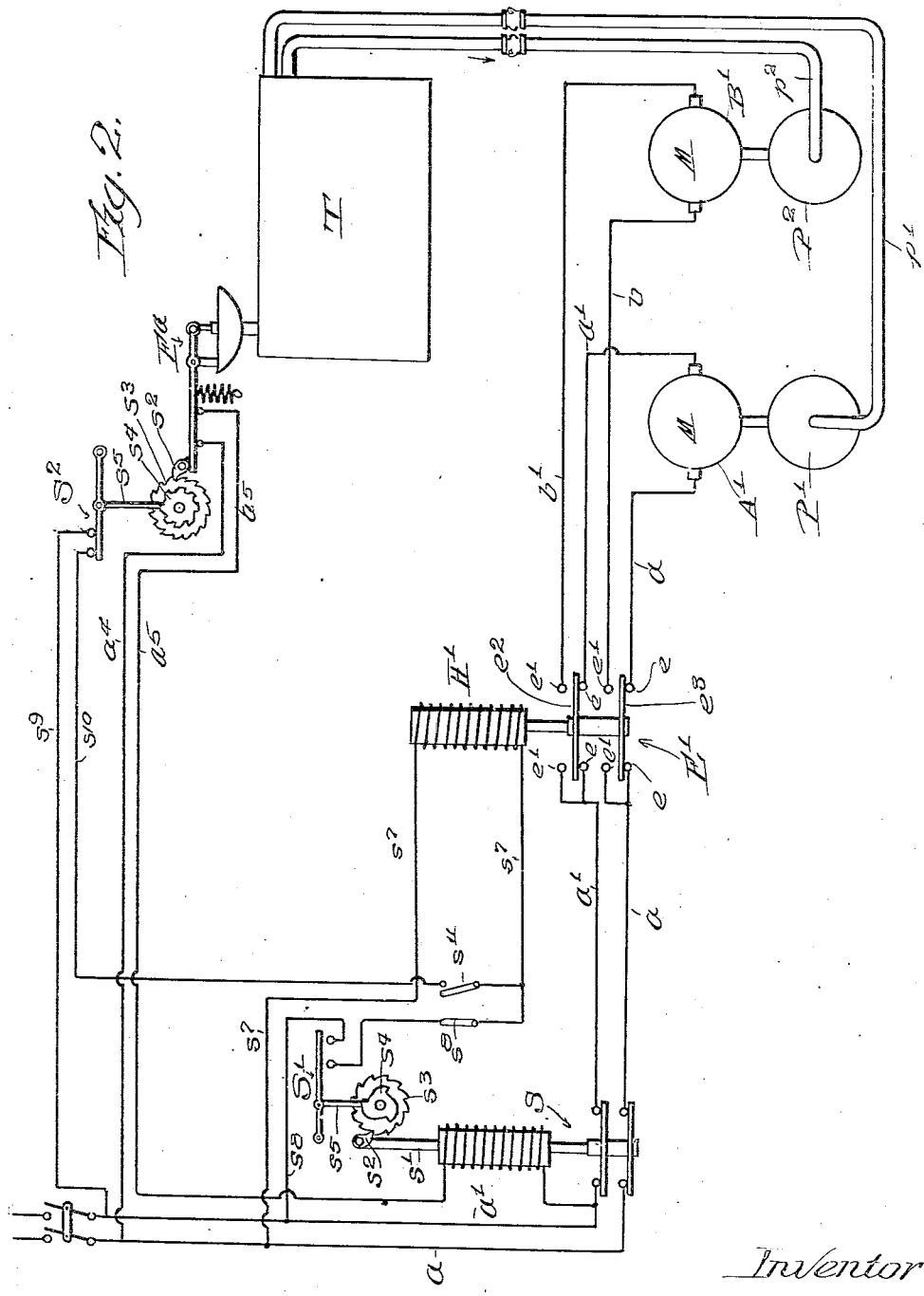

1,780,380

UNITED STATES PATENT OFFICE

AUGUSTUS C. DURDIN, JR., OF CHICAGO, ILLINOIS

AUTOMATIC CONTROL SYSTEM FOR ELECTRIC MOTORS

Application filed December 31, 1927. Serial No. 243,815.

This invention relates to automatic control systems for electric motors, and its principal object is to provide automatic control means for a plurality of electric motors whereby at least one, of a number of motors, is automatically started upon the taking place of a change of some condition in the system with which the motors are used.

There are many situations where a number of electric motors are employed for performing certain work, where only one or a limited number of the whole number of motors, is or are required to operate at a time, to perform the work under normal conditions. For the purpose of distributing the work among the several motors, it is customary to operate them in some predetermined sequence, for instance if two motors are employed they may be caused to operate alternately or one motor may be caused to operate a number of times in succession, after which the other motor may be caused to operate a number of times in succession and so on. In accordance with the present invention an electric switch is provided for the several motors, which switch is set to automatically close the circuit to any of the motors upon a change of some condition in the system which effects the operation of the switch, said switch operating in conjunction with automatically acting sequence controlling mechanism, which controls the circuits to the several motors in such manner that they will be started alternately or in some other regular sequence and stopped when their work has been performed. In accordance with another phase of the invention, a second electric switch is provided whereby the idle motor or motors may be automatically started in case the active motor is unable to perform all of the work required by it.

The invention consists in an automatic control system having automatically acting sequence controlling mechanism for the motors, operating at intervals to open and close breaks or gaps in the circuits to the several motors, whereby a single automatically operating switch may be used for closing the individual circuits to the several motors in alternate fashion or in any other predetermined sequence.

The invention further consists in a system as above outlined in which a second automatically operated switch is provided whereby the idle motor may also be started in case the active motor is unable to perform the work required of it. The invention further consists in the several novel features hereinafter fully set forth and claimed.

The invention is clearly illustrated in the drawing accompanying this specification, in which Fig. 1 is a diagrammatic view of an automatic control system for electric motors illustrating one embodiment of the invention, and Fig. 2 is a diagrammatic view illustrating another application of the invention.

Referring to said drawings and first to Fig. 1, which is merely diagrammatic or schematic, and illustrative of one embodiment of the invention, the reference letters A, B, designate two electric motors, which may be used for any suitable purpose, among which is that of operating pumps, such as liquid, gas, sewage and other pumps. Electric conductor wires $a, a^1, b, b^1$, lead from said motors to the main electric conductor wires $c, c^1$, and if desired switches $d$, may be interposed in the conductor wires between the motors and main wires. The conductor wires $a, a^1, b, b^1$, lead through a switch E, which switch may be in the form of a time controlled "double throw" switch and from said switch E, the electric conductors $a, a^1, b, b^1$, for the motors run to other switches F, G. The double throw switch E, contains stationary terminals $e, e^1$, for the electric conductors $a, a^1, b, b^1$, and movable contact members $e^2, e^3, e^4, e^5$, mounted upon and insulated from a bar $e^6$, and arranged to close the circuits through the terminals $e$, and through the terminals $e^1$, as the case may be. As shown the movable contact members are connected through the bar $e^6$, with a solenoid H which, when energized, is arranged to move the bar $e^6$, and therewith the movable contact members to close the circuit through the terminals $e^1$. When deenergized the contact members return to the other position in contact with the terminals $e$.

The solenoid H, comprises one element of means for actuating the movable contact members, and intermittently acting mechanism is provided for periodically energizing said solenoid whereby it may move the movable contact members into contact with the stationary contact pieces or terminals $e^1$. Various forms of mechanisms may be employed for this purpose, for instance time clock mechanism may be used for closing a circuit to the solenoid, or any suitable motor driven train of speed reducing gears may be employed for periodically closing a switch in the circuit to the solenoid. Time controlled mechanical mechanism may be employed for actuating the double throw switch. In the simple form of the invention illustrated, an electric motor I, is provided, the shaft of which rotates a pinion $i$, which meshes with a gear wheel $j$, on the shaft of which is mounted a small pulley $k$, connected to a large pulley $l$, by a belt $m$, trained over said pulleys $k$, $l$. On the shaft of the pulley $l$, is mounted a switch actuating element here shown in the form of a cam disc $n$, having a plurality of raised portions separated by depressed portions on which rides a stem or rod $o$, which engages with the movable element $p$, of an electric switch $r$. The switch $r$, is interposed in the electric circuit $s$, for the solenoid H. The circuit $t$, for the motor and circuit $s$, for the solenoid run to the main conductor wires $c$, $c^1$, and may have a hand operated switch $u$, interposed therein. It will be observed that the pinion $i$, gear wheel $j$, pulleys, $k$, $l$, and belt $m$, form speed reducing gearing by which the switch actuating cam disc $n$, may be rotated very slowly and the electric switch $r$, thereby closed and opened at suitable intervals. Obviously by sufficiently reducing the speed at which the switch actuating element moves, the switch $r$ may be closed often, as for instance every minute, hour or so, or it may be closed less frequently, as for instance every six hours or every twenty-four hours. The frequency of operation of the switch closing means depends upon the frequency with which it is desired to throw the double throw switch and is arranged to operate accordingly.

The switches F, G, may be in the nature of float switches, pressure or vacuum switches, or switches actuated by fluctuations in the flow of liquid or gases, or thermostatically controlled switches, and they are arranged to normally be in open position, but adapted to be automatically closed upon the change of condition in the system with which the switches are connected. The switch F, which may be conveniently termed a "pilot switch", is set to close in advance of the switch G, and when closed it closes the circuit to one of the motors A, B, depending upon which circuit is otherwise complete, and the switch G, operates to close the circuit to the idle motor, in case the motor which was set in operation by the closing of the switch F, is unable to perform all of the work required by it. As an example of means which may be employed for actuating the switches F, G, floats $F^1$, $G^1$, are shown, which have float rods $f$, $g$, provided with spaced buttons $f^1$, $g^1$, that are arranged to engage with switch levers $f^2$, $g^2$, of the switches F or G, to throw said switches. The floats $F^1$, $G^1$, may be contained in a tank or other liquid receiving receptacle from which or into which it is desired to pump the liquid by pumps (not shown) that are driven by the motors A, B.

As a practical example for the employment of the system, a pump may be connected to each motor A, B, for use in ejecting liquid from a receptacle, and the floats $F^1$, $G^1$, may be contained in said receptacle and may operate to open and close the switches F, G, it being understood that the lower button $f^1$, is set to actuate the switch lever $f^2$, of the pilot switch F before the lower button $g^1$, of the other float rod $g$, actuates the switch lever $g^2$, of the switch G. As has been explained, however, the switches F, G, may be of any character capable of being actuated upon a change of the conditions in the system with which the switches are used. The circuits between switches F, G, and the motors A, B, will now be traced. Assuming the apparatus to be in the position illustrated in the drawing, with the switches $d$, $d$, $u$, closed, the circuit from the pilot switch F, to the motor A, may be traced through the conductor $a$, from the switch F, to the terminal $e$, which is in contact with the movable contact member $e^3$, of the double throw switch E, thence through the other terminal $e$, which is in contact with said movable contact member $e^3$, thence through the conductor $a$, to the motor A, the source of electrical supply and back through the conductor $a^1$, to the terminal $e$, of the switch F, which is in contact with the movable contact member $e^2$, thence through the other terminal $e$, which is in contact with said movable contact member $e^2$, and thence through the conductor $a^1$, back to the pilot switch F. Whenever the pilot switch F, is closed, the motor A, will be started and will continue to run until the switch F, is again opened and this condition remains so long as the movable contact members of the switch E, are in contact with the terminals $e$.

The circuit from the switch G, to the motor B, may be traced through the conductor $b$, the terminal $e$, which is in contact with the movable contact member $e^5$, the other terminal $e$, in contact therewith, and the conductor $b$, to and through the motor B, and source of electric supply, back through the conductor $b^1$, to the terminal $e$, which is in contact with the movable contact member $e^4$, thence through the other terminal $e$, which is in contact with said movable contact member $e^4$, and through the conductor $b^1$, back to the switch G. Whenever the switch G, is closed the motor B, will be started and will continue to run until the switch G, is again opened and this condition remains so long as the movable contact members of the switch E, are in contact with the terminals $e$.

While the double throw switch E in the position illustrated in the drawing, the motor A, will be started and stopped as often as the switch F, is closed and opened, and in case the motor A, is unable to handle all of the work required by it, the switch G, will be closed and the motor B, started, and both motors will run until the work has been accomplished and both switches F, G, opened, whereupon both motors will stop. It will be understood that the motor A, is started first because the switch F, is set to close before the switch G, closes.

Assuming that sufficient time has elapsed for the cam disc $n$, to close the switch $r$, the solenoid H, will thereupon become energized and the movable contact members of the switch E, will be moved out of contact with the terminals $e$, and into contact with the terminals $e^1$. The break in the circuit between the switch F, and motor B, will now be closed in the switch E, and the break in the circuit between the switch G, and motor A, will also be closed. Assuming, therefore, that the movable contact pieces $e^2$, $e^3$, $e^4$, $e^5$, are now in contact with the terminals $e^1$. The circuit between the pilot switch F, and the motor B, may be traced as follows:

From the switch F, the circuit leads through the conductor $a$, to the terminal $e^1$, now in contact with the movable contact member $e^3$, thence through said contact member and terminal $e^1$, which is in contact therewith, thence through the conductor $b$, and to and through the motor B, and source of electric supply and back through the conductor $b^1$, to the terminal $e^1$, which is now in contact with the movable contact member $e^2$, of the switch E, thence through the other terminal $e^1$, which is in contact with said contact member $e^2$, and back to the pilot switch F, through the conductor $a^1$. Each time that the pilot switch F is closed while the double throw switch E, is in the position now assumed, the motor B, will be started and will continue to run until the switch F, is again opened.

The circuit from the switch G, to the motor A, may be traced through the conductor $b$, to the terminal $e^1$, which is in contact with the movable contact member $e^5$, of the switch E, thence through the other terminal $e^1$, which is in contact with said movable contact member $e^5$, through the conductor $a$, to and through the motor A, and source of electric supply and back through the conductor $a^1$, to the terminal $e^1$ which is in contact with the movable contact member $e^4$, thence through the other terminal $e^1$, which is in contact with the movable contact member $e^4$, and back to the switch G, through the conductor $b^1$. As will be understood, the circuit through the switch G, will be closed in case the motor B, is unable to handle the work required of it and the motor A, will thereupon be started and will continue to operate in conjunction with the motor B, until the work required of them has been completed whereupon both switches F, and G, will be opened and both motors stopped.

After a suitable lapse of time, the cam disc $n$, will again permit the switch $r$, to be opened, whereupon the solenoid H, will be deenergized and the movable contact members $e^2$, $e^3$, $e^4$, $e^5$, again brought into contact with the terminals $e$, thereby closing the gaps or breaks in the circuits between the switch F, and motor A, and between the switch G, and motor B.

In the form of the invention described in connection with Fig. 1, the sequence of operation of the motors is governed by time controlled mechanism. In Fig. 2 is illustrated an application of the invention to a system wherein the sequence of operation of the motors is governed by changes of some condition in the system with which the apparatus is used. For instance the sequence of operation of the motors may be governed by changes of the level of liquid, by the change of pressure or vacuum, by changes in the velocity of flow of a fluid, by thermostatic changes and so forth, any of which will result in the operation of an electric switch or other device and cause the operation of the sequence control switch for the circuits of the electric motors.

In the form of the invention illustrated in Fig. 2 the automatic switch corresponding with the switch F is shown at $F^a$ and is arranged to be actuated by changes of conditions in the system with which the apparatus is used. For instance the switch $F^a$ may be in the form of a vacuum switch or a pressure switch used in connection with a reservoir or tank T. The motors $A^1$, $B^1$ are connected to and drive pumps $P^1$ and $P^2$ which are connected to the tank T by pipe connections $p^1$, $p^2$. When the tank T is used as a vacuum tank or a tank from which fluid or liquid is exhausted, the switch $F^a$ may be in the form of a vacuum switch and the pumps $P^1$, $P^2$ may be in the form of vacuum pumps. The circuits for the motors $A^1$, $B^1$, lead through an automatic sequence controlling switch $E^1$, which if desired may be in the form of a double throw switch, thence through a starter S, and to the main line. The circuits may be traced from the motors through the conductors $a$, $a^1$, $b$, $b^1$, the terminals $e$, $e^1$, and movable contact members $e^2$, $e^3$, of the double throw switch, through the starter S, and from the starter to the main line through the conductors $a$, $a^1$. The conductors $a^4$, $a^5$, lead from the vacuum switch $F^a$, through the starter S, to the main conductors $a$, $a^1$. Whenever the vacuum switch F$^a$, is closed as for instance when the vacuum in the tank T is being built up to a predetermined point the starter S is energized and the circuit through the conductors $a$, $a^1$, closed at the starter and one motor A$^1$, or B$^1$, is in operation, depending upon the position of the double throw switch E$^1$.

The double throw switch is actuated by mechanism, which may be in the form of a mechanically operated device, or a hydraulically operated device, or one operated by fluctuations of vacuum or pressure or it may be electrically operated and controlled from the vacuum switch F$^a$ whereby the sequence of operation of the motors may be governed by the changes of vacuum or pressure in the tank T.

For instance the starter S may be arranged to close an electric circuit, at intervals, for the double throw switch E', or the vacuum switch F$^a$ may be used to close said circuit, at intervals, whereby said double throw switch will be actuated, to direct the electric current to one or the other of the motors. In the one case, a movable element $s^1$ of the starter may have a pawl $s^2$ thereon for turning a ratchet wheel $s^3$ connected with a cam disc $s^4$, having raised and depressed portions which alternately engage with a rod or stem $s^5$ connected with the switch arm S$^6$ of a switch S$^1$. It will be understood that each time the starter S is energized and the movable element $s^1$ thereof is thereby actuated, the ratchet wheel $s^3$ will be advanced one tooth and by properly proportioning the number of teeth on the ratchet wheel and the raised places on the cam disc $s^4$, the switch S$^1$ may be made to close the electric circuit through it, as frequently as desired and thus the double throw switch E$^1$ may be operated so as to close the circuit to one motor or the other in any desired sequence. The electric circuit to the solenoid H$^1$ of the double throw switch is traced through the conductors $s^7$, $s^8$, and switch S$^1$ to the main line $a$, $a^1$. A hand operated switch S$^8$ may be provided in said circuit to render the same inoperative for any reason.

Instead of using the starter S to close the circuit for the solenoid of the double throw switch, circuit closing mechanism operated by the vacuum switch F$^a$ may be employed for this purpose. Conveniently pawl and ratchet mechanism similar to the pawl and ratchet mechanism shown in connection with the starter S may be employed for opening and closing a switch S$^2$. The electric circuit for the solenoid H$^1$ of the double throw switch may be traced from the switch S$^2$ through the conductors $s^9$, $s^{10}$ and $s^7$. A hand operated switch $s^{11}$ is interposed in this circuit whereby it may be rendered inoperative. It will be observed that each time the vacuum switch F$^a$ is actuated to break the circuit to the starter, the ratchet wheel $s^3$ is turned one tooth, and that when turned through a sufficient extent the pin or rod S$^5$ is moved from a high place to a low place on the cam disc or moved from a low place to a high place. The circuit to the solenoid of the double throw switch E' is thereby closed and opened at intervals and the electric current consequently is directed to one or the other motors A$^1$, B$^1$, in regular sequence. By closing one of the switches $s^8$, $s^{11}$, and opening the other, the sequence of operation of the motors may be controlled from the starter S, or directly from the vacuum switch F$^a$, depending upon which switch $s^8$ or $s^{11}$ is closed.

From the above it is apparent that the sequence of operation of the motors may be controlled by timing mechanism, operating in conjunction with an electric switch which is operated as a result of changes in some condition taking place in the system with which the apparatus is used, or the sequence of operation of the motors may be controlled from an electric switch which itself is actuated as a result of a change of some condition taking place in the system with which the apparatus is used. Furthermore, that although the double throw switch has been described as an electrically operated one, it may be mechanically operated or operated by any automatic means under the control of timing mechanism or an automatically operated switch which is actuated as a result of a change of some condition taking place in the system.

Furthermore, it is apparent that while one of the automatic switches may be set to close in advance of the other, the sequence controlling double throw switch for the several motors controls the sequence of operation of said motors, whereby the work required by them may be distributed among the several motors.

By the term "double throw switch" is meant any switch mechanism operating to cut in one circuit and cut out another. By the term "automatically operated switch" is meant an electric switch, capable of being operated as a result of changes of pressure, vacuum, level of a liquid, the flow of a fluid or thermostatic changes in a fluid.

More or less variation of the exact details of construction is possible without departing from the spirit of this invention; I desire, therefore, not to limit myself to the exact form of the construction shown and described, but intend, in the following claims to point out all of the invention disclosed herein.

I claim as new, and desire to secure by Letters Patent:

1. In an automatic control system for a plurality of electric motors, the combination of several electric circuits, including an electric motor in each circuit, an automatically operated switch for said circuits, intermittently acting mechanism, and an automatically operating sequence controlling switch for the motors, interposed in said circuits between said automatically operated switch and the motors, said sequence controlling switch being responsive to said intermittently acting mechanism.

2. In an automatic control system for a plurality of electric motors, the combination of several electric circuits, including an electric motor in each circuit, automatically operated switches for said circuits for controlling the duration of operation of said motors, one of said switches being set to close in advance of another, intermittently acting mechanism, and an automatically operating sequence controlling switch for the motors, interposed in said circuits between said automatically operated switches and the motors, said sequence controlling switch being responsive to said intermittently acting mechanism.

3. In an automatic control system for a plurality of electric motors, the combination of several electric circuits, including an electric motor in each circuit, an automatically operated switch for said circuits, a double throw switch interposed in said circuits between said automatically operated switch and the motors, and switch actuating mechanism for said double throw switch having a switch throwing element operated at intervals.

4. In an automatic control system for a plurality of electric motors, the combination of several electric circuits, including an electric motor in each circuit, automatically operated switches for said circuits, one of said switches being set to close in advance of another, a double throw switch interposed in said circuits between said automatically operated switch and motors, and switch actuating mechanism for said double throw switch having a switch throwing element operated at intervals.

5. In an automatic control system for several motors, the combination of several electric circuits, including an electric motor in each circuit, a float operated electric switch, for said circuits, intermittently acting mechanism, and an automatically operated sequence controlling switch interposed in said circuits between said float operated electric switch and the motors, said sequence controlling switch being responsive to said intermittently acting mechanism.

6. In an automatic control system for several motors, the combination of several electric circuits, including an electric motor in each circuit, a float operated electric switch, for said circuits, a double throw switch interposed in said circuits between said float operated electric switch and the motors, and switch actuating mechanism for said double throw switch having a switch throwing element operated at intervals.

7. In an automatic control system for several motors, the combination of several electric circuits, including an electric motor in each circuit, float operated electric switches, one for each of said circuits, and one being set to close in advance of another, intermittently acting mechanism and an automatically operating double throw switch interposed in said circuits between said float operated switches and motors, said automatically operating double throw switch being responsive to said intermittently acting mechanism.

8. In an automatic control system for several motors, the combination of several electric circuits, including an electric motor in each circuit, float operated electric switches, one for each of said circuits, and one being set to close in advance of another, a double throw switch interposed in said circuits between said float operated electric switch and the motors, and switch actuating mechanism for said double throw switch having a switch throwing element operated at intervals.

9. In an automatic control system for a plurality of electric motors, the combination of several electric circuits, including an electric motor in each circuit, an automatically operated switch for said circuits, and a time controlled double throw switch interposed in said circuits between said automatically operated switch and the motors.

10. In an automatic control system for a plurality of electric motors, the combination of several electric circuits, including an electric motor in each circuit, automatically operated switches for said circuits, one of said switches being set to close in advance of another, and a time controlled double throw switch interposed in said circuits between said automatically operated switches and the motors.

11. In an automatic control system for a plurality of electric motors, the combination of several electric circuits, including an electric motor in each circuit, an automatically operated switch for said circuits, a double throw switch interposed in said circuits between said automatically operated switch and the motors, and switch actuating mechanism for said double throw switch having a periodically operated switch throwing element.

12. In an automatic control system for a plurality of electric motors, the combination of several electric circuits, including an electric motor in each circuit, automatically operated switches for said circuits, one of said switches being set to close in advance of another, a double throw switch interposed in said circuits between said automatically operated switch and the motors, and switch actuating mechanism for said double throw switch having a periodically operated switch throwing element.

13. In an automatic control system for several motors, the combination of several electric circuits, including an electric motor in each circuit, a float operated electric switch, for said circuits, and a time controlled double throw switch interposed in said circuits between said float operated electric switch and the motors.

14. In an automatic control system for several motors, the combination of several electric circuits, including an electric motor in each circuit, a float operated electric switch, for said circuits, a double throw switch interposed in said circuits between said float operated electric switch and the motors, and switch actuating mechanism for said double throw switch having a periodically operated switch throwing element.

15. In an automatic control system for several motors, the combination of several electric circuits, including an electric motor in each circuit, float operated electric switches, one for each of said circuits, and one being set to close in advance of another, and a time controlled double throw switch interposed in said circuits between said float operated switches and motors.

16. In an automatic control system for several motors, the combination of several electric circuits, including an electric motor in each circuit, float operated electric switches, one for each of said circuits, and one being set to close in advance of another, a double throw switch interposed in said circuits between said float operated electric switch and the motors, and switch actuating mechanism for said double throw switch having a periodically operated switch throwing element.

17. In an automatic control system for a plurality of electric motors, the combination of several electric circuits, including an electric motor in each circuit, intermittently acting mechanism, an automatically operating sequence controlling switch for the motors, interposed in said circuits, said sequence controlling switch being responsive to said intermittently acting mechanism, and an independent automatically operating switch for starting and stopping the motors.

18. In an automatic control system for a plurality of electric motors, the combination of several electric circuits, including an electric motor in each circuit, a double throw sequence controlling switch interposed in said circuits, intermittently acting mechanism, switch actuating mechanism for said double throw switch having a switch throwing element operated at intervals in response to said intermittently acting mechanism, and an independent automatically operating switch for starting and stopping the motors.

19. In an automatic control system for a plurality of electric motors, the combination of several electric circuits, including an electric motor in each circuit, a time controlled double throw sequence controlling switch interposed in said circuits, and an independent automatically operating switch for starting and stopping the motors.

AUGUSTUS C. DURDIN, Jr.